(12) United States Patent
Fukuoka et al.

(10) Patent No.: US 8,450,423 B2
(45) Date of Patent: May 28, 2013

(54) FLUORINE-CONTAINING ELASTOMER MIXTURE, METHOD FOR PRODUCING SAME, COMPOSITION FOR VULCANIZING PEROXIDE, AND MOLDED ARTICLE

(75) Inventors: Shoji Fukuoka, Settsu (JP); Keiko Washino, Settsu (JP); Shuumi Nishii, Settsu (JP); Daisuke Ota, Settsu (JP); Mitsuru Kishine, Decatur, AL (US)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 13/260,913

(22) PCT Filed: Mar. 30, 2010

(86) PCT No.: PCT/JP2010/055709
§ 371 (c)(1),
(2), (4) Date: Sep. 28, 2011

(87) PCT Pub. No.: WO2010/113951
PCT Pub. Date: Oct. 7, 2010

(65) Prior Publication Data
US 2012/0029152 A1    Feb. 2, 2012

(30) Foreign Application Priority Data

Mar. 31, 2009 (JP) ................................. 2009-088265

(51) Int. Cl.
| | |
|---|---|
| *C08F 8/00* | (2006.01) |
| *C08L 23/00* | (2006.01) |
| *C08L 23/04* | (2006.01) |
| *C08L 23/10* | (2006.01) |
| *C08K 5/17* | (2006.01) |
| *C08K 5/18* | (2006.01) |
| *A01N 33/06* | (2006.01) |

(52) U.S. Cl.
USPC ........... 525/191; 525/240; 524/247; 524/250; 524/254; 524/255

(58) Field of Classification Search
USPC .................. 525/199, 200; 524/247, 250, 254, 524/255
See application file for complete search history.

(56) References Cited

U.S. PATENT DOCUMENTS

| | | | |
|---|---|---|---|
| 5,049,622 A | 9/1991 | Abe | |
| 7,879,948 B2 * | 2/2011 | Ogata et al. | ................... 525/199 |
| 2009/0093590 A1 | 4/2009 | Okazaki | |

FOREIGN PATENT DOCUMENTS

| | | |
|---|---|---|
| JP | 3-122106 A | 5/1991 |
| JP | 6-306243 A | 11/1994 |
| JP | 2000-212363 A | 8/2000 |
| JP | 2000-212363 A | 8/2000 |
| JP | 2002-037965 A | 2/2002 |
| JP | 2002-037965 A | 2/2002 |
| JP | 2006-228805 A | 8/2006 |

* cited by examiner

*Primary Examiner* — Nathan M Nutter
(74) *Attorney, Agent, or Firm* — Sughrue Mion, PLLC

(57) ABSTRACT

A fluoroelastomer mixture, including: a peroxide-vulcanizable fluoroelastomer (A) containing an iodine atom; and a peroxide-vulcanizable fluoroelastomer (B) containing an iodine atom. The fluoroelastomer (A) is a copolymer (a1) consisting of 50 to 85 mol % of a vinylidene fluoride unit and 15 to 50 mol % of a perfluoro(alkyl vinyl ether) unit, or a copolymer (a2) consisting of 45 to 85 mol % of a vinylidene fluoride unit, 1 to 30 mol % of a tetrafluoroethylene unit, and 14 to 30 mol % of a perfluoro(alkyl vinyl ether) unit. Further the fluoroelastomer (B) has a fluorine content of 70.0% or more. Also disclosed is a composition for peroxide vulcanization containing the above fluoroelastomer composition (i), a polyfunctional unsaturated compound (ii) and a peroxide (iii), as well as a method for producing the fluoroelastomer mixture.

7 Claims, No Drawings

FLUORINE-CONTAINING ELASTOMER MIXTURE, METHOD FOR PRODUCING SAME, COMPOSITION FOR VULCANIZING PEROXIDE, AND MOLDED ARTICLE

CROSS REFERENCE TO RELATED APPLICATIONS

This application is a National Stage of International Application No. PCT/JP2010/055709 filed Mar. 30, 2010, claiming priority based on Japanese Patent Application No. 2009-088265 filed Mar. 31, 2009, the contents of all of which are incorporated herein by reference in their entirety.

TECHNICAL FIELD

The present invention relates to a fluoroelastomer mixture, a method for producing the same, a composition for peroxide vulcanization, and a formed product.

BACKGROUND ART

Low-temperature-resistant fluororubbers obtainable by copolymerizing perfluoro alkyl vinyl ether (PAVE) with vinylidene fluoride (VdF) as a base component show excellent low-temperature resistance even at low temperatures as low as −25° C. or lower. However, low fuel permeability, which is needed for rubbers used in automobiles, is poorer in low-temperature-resistant fluororubbers than that of a VdF/hexafluoro propylene (HFP) copolymer or a VdF/HFP/tetrafluoroethylene (TFE) copolymer. Therefore, achievement of both the low-temperature resistance and the low fuel permeability is desired.

The low fuel permeability of low-temperature-resistant fluororubbers is improved in such a way that a fluorine content of rubbers is increased to reduce compatibility of the rubbers with fuels. However, in this case, low-temperature resistance of fluororubbers is lowered.

Thermoplastic elastomers obtainable by block polymerization of fluororesin components with fluoroelastomers are excellent in low permeability of automobile fuel. This is because resin components in polymers inhibit permeation of fuel. However, in formed products obtained from such elastomers, the amount of the resin components need to be increased for achievement of such low permeability, which results in an increase in hardness of the formed products or deterioration of low-temperature resistance of the fluoroelastomers. Such formed products lose rubber-like properties. Accordingly, materials having both low fuel permeability and low-temperature resistance, desired in the present invention, have not been able to be provided.

Patent Document 1 discloses a method for producing a fluorocopolymer in which TFE and perfluoromethylvinyl ether (PMVE), which is PAVE, are copolymerized in the presence of an iodine- and/or bromine-containing compound, TFE and VdF are subsequently fed to the reaction system without discharging unreacted monomers, and the copolymerization reaction is continuously carried out. In the production method in accordance with Patent Document 1, a copolymer can be produced in high yield, which results in high productivity. However, the achievement of both the low-temperature resistance and the low fuel permeability has not realized yet.

Patent Document 1: JP 3-122106 A

SUMMARY OF THE INVENTION

An object of the present invention is to provide a fluoroelastomer mixture which can be made into a formed product with low hardness and excellent low fuel permeability, while maintaining low-temperature resistance of a low-temperature-resistant fluororubber, a composition for peroxide vulcanization including the fluoroelastomer mixture, and a formed product obtained from the composition for peroxide vulcanization.

The present invention is a fluoroelastomer mixture, comprising: a peroxide-vulcanizable fluoroelastomer (A) containing an iodine atom; and a peroxide-vulcanizable fluoroelastomer (B) containing an iodine atom, the fluoroelastomer (A) being a copolymer (a1) consisting of 50 to 85 mol % of a vinylidene fluoride unit and 15 to 50 mol % of a perfluoro(alkyl vinyl ether) unit, or a copolymer (a2) consisting of 45 to 85 mol % of a vinylidene fluoride unit, 1 to 30 mol % of a tetrafluoroethylene unit, and 14 to 30 mol % of a perfluoro(alkyl vinyl ether) unit, a fluorine content of the fluoroelastomer (B) being 70.0% by mass or more.

The fluoroelastomer (B) is preferably at least one copolymer selected from the group consisting of: a copolymer (b1) consisting of 45 to 85 mol % of a tetrafluoroethylene unit and 15 to 55 mol % of a perfluoro(alkyl vinyl ether) unit; a copolymer (b2) consisting of 15 to 85 mol % of a tetrafluoroethylene unit, 1 to 30 mol % of an ethylene unit, and 14 to 55 mol % of a perfluoro(alkyl vinyl ether) unit; and a copolymer (b3) consisting of 25 to 85 mol % of a vinylidene fluoride unit, 0 to 40 mol % of a tetrafluoroethylene unit, and 15 to 40 mol % of a hexafluoropropylene unit.

A mass ratio (A)/(B) of the fluoroelastomer (A) to the fluoroelastomer (B) is preferably 60/40 to 95/5.

The present invention is also a composition for peroxide vulcanization, comprising: the fluoroelastomer mixture (i), a polyfunctional unsaturated compound (ii), and a peroxide (iii).

The present invention is also a formed product obtainable by forming the composition for peroxide vulcanization.

The present invention is also a method for producing the fluoroelastomer mixture, comprising the step of co-coagulation of aqueous dispersion containing the fluoroelastomer (A) and the fluoroelastomer (B).

EFFECT OF THE INVENTION

A formed product having both low-temperature resistance and low fuel permeability can be produced using a fluoroelastomer mixture of the present invention. Further, the fluoroelastomer mixture of the present invention can be produced without undergoing complicated processes, such as an exchanging operation of polymerization monomers needed in conventional production of a block copolymer. Therefore, the fluoroelastomer mixture can be produced with high productivity.

MODE FOR CARRYING OUT THE INVENTION

The present invention relates to a fluoroelastomer mixture, comprising: a peroxide-vulcanizable fluoroelastomer (A) containing an iodine atom; and a peroxide-vulcanizable fluoroelastomer (B) containing an iodine atom, the fluoroelastomer (A) being a copolymer (a1) consisting of 50 to 85 mol % of a vinylidene fluoride [VdF] unit and 15 to 50 mol % of a perfluoro(alkyl vinyl ether) [PAVE] unit, or a copolymer (a2) consisting of 45 to 85 mol % of a vinylidene fluoride unit, 1 to 30 mol % of a tetrafluoroethylene [TFE] unit, and 14 to 30 mol % of a perfluoro(alkyl vinyl ether) unit, a fluorine content of the fluoroelastomer (B) being 70.0% by mass or more. Both the copolymer (a1) and the copolymer (a2) may be used together as the fluoroelastomers (A).

The term "monomer unit" herein means a repeating unit derived from a monomer.

The fluoroelastomer mixture of the present invention can be made into a formed product with low hardness and excellent low fuel permeability, while maintaining the low-temperature resistance of a low-temperature-resistant fluororubber. Such a fluoroelastomer which is made into a formed product with low hardness, excellent low-temperature resistance, and low fuel permeability may be a block copolymer made by block copolymerization of a monomer of the fluoroelastomer (A) with a monomer of the fluoroelastomer (B). However, the block copolymer is produced in a one-pot synthesis, which needs repetitive block polymerization. Therefore, monomers need to be exchanged. The fluoroelastomer mixture of the present invention can be simply produced without performing such exchanging, which leads to an improvement in productivity and a reduction in costs.

Since the fluoroelastomer mixture of the present invention includes two kinds of elastomers, the fluoroelastomer (A) and the fluoroelastomer (B), a formed product formed using the fluoroelastomer mixture which is a composition for vulcanization has low hardness and excellent compression set, for example.

A configuration of the fluoroelastomer mixture is not particularly limited as long as the fluoroelastomer mixture includes the fluoroelastomer (A) and the fluoroelastomer (B). For example, the fluoroelastomer mixture may be a mixed powder of powder of the fluoroelastomer (A) and powder of the fluoroelastomer (B), or an aqueous dispersion including the fluoroelastomer (A) and the fluoroelastomer (B).

The fluoroelastomer mixture does not generally have a melting point derived from the fluoroelastomers (A) and (B). The presence or the absence of a melting point is confirmed, for example, in such a way that mixed powder including the powder of the fluoroelastomer (A) and the powder of the fluoroelastomer (B) is measured for heat balance of a second scan at a rate of temperature rise of 10° C./min in a temperature range of 60° C. to 400° C. using a differential scanning calorimetry (DSC), and whether peaks derived from the fluoroelastomers (A) and (B) can be determined or not in the range is confirmed.

In the fluoroelastomer mixture, the mass ratio (A)/(B) of the fluoroelastomer (A) to the fluoroelastomer (B) is preferably 60/40 to 95/5. The fluoroelastomer mixture with the above mentioned mass ratio can have both low-temperature resistance and low fuel permeability. In order to increase both the low-temperature resistance and low fuel permeability in a good balance, the content ratio (A)/(B) is more preferably 65/35 to 90/10 in a mass ratio, and further preferably 65/35 to 80/20.

The PAVE of the copolymers (a1) and (a2) as the fluoroelastomer (A) is preferably perfluoro(methyl vinyl ether) [PMVE] or perfluoro(alkoxy vinyl ether) represented by $CF_2=CFORf$ because of their excellent low-temperature resistance and flexibility. In the formula, Rf is a C3-C10 perfluoroether group containing 1 to 2 ether bonds. Specific examples of perfluoro(alkoxy vinyl ether) represented by $CF_2=CFORf$ include $CF_2=CFO(CF_2O)_lR^1$, $CF_2=CFO(CF_2CF_2O)_mR^1$, $CF_2=CFO(CF_2CF_2CF_2O)_nR^1$, and $CF_2=CFO\ CF_2CF(CF_3)OR^1$, where $R^1$ is a C1-C5 perfluoroalkyl group, and l, m, and n each are 1 or 2. The perfluoro(alkyl vinyl ether) unit of the copolymers (a1) and (a2) is more preferably a perfluoro(methyl vinyl ether) unit, a perfluoro(ethyl vinyl ether) unit, or a perfluoro(propyl vinyl ether) unit, and still more preferably a perfluoro(methyl vinyl ether) unit.

In the fluoroelastomer (A), the PAVE may be used alone, or two or more of these may be used in combination.

In the case where the fluoroelastomer (A) is the copolymer (a1), the fluoroelastomer (A) consists of 50 to 85 mol % of a vinylidene fluoride unit and 15 to 50 mol % of a perfluoro (alkyl vinyl ether) unit. Therefore, the fluoroelastomer (A) has good low-temperature resistance and flexibility. The copolymer (a1) more preferably consists of 55 to 80 mol % of a vinylidene fluoride unit and 20 to 45 mol % of a perfluoro (alkyl vinyl ether) unit.

In the case where the fluoroelastomer (A) is the copolymer (a2), the fluoroelastomer (A) consists of 45 to 85 mol % of a vinylidene fluoride unit, 1 to 30 mol % of a tetrafluoroethylene unit, and 14 to 30 mol % of a perfluoro(alkyl vinyl ether) unit. Therefore, the fluoroelastomer (A) has good low-temperature resistance and flexibility. The copolymer (a2) more preferably consists of 50 to 80 mol % of a vinylidene fluoride unit, 5 to 25 mol % of a tetrafluoroethylene unit, and 15 to 28 mol % of a perfluoro(alkyl vinyl ether) unit.

The number average molecular weight (Mn) of the fluoroelastomer (A) may depend on the amount of the fluoroelastomer (B). In order to produce a fluoroelastomer mixture with good forming processability and improve the dispersibility of the fluoroelastomer (B), the fluoroelastomer (A) preferably has a Mn of 20,000 or greater, and more preferably 30,000 or more; further, it is preferably 300,000 or less, and more preferably 200,000 or less.

The Mooney viscosity of the fluoroelastomer (A) at 100° C. is preferably 2 or higher, and more preferably 5 or higher; further, it is preferably 200 or lower, and more preferably 150 or lower in order for producing a fluoroelastomer mixture excellent in forming processability the same as that provided by the fluoroelastomer (A) with the above-mentioned Mn.

The fluorine content of the fluoroelastomer (A) is preferably 63.5% by mass or more, more preferably 64.0% by mass or more, and still more preferably 64.5% by mass or more because such a fluoroelastomer (A) has good low fuel permeability. Further, the fluorine content of the fluoroelastomer (A) is preferably 68.0% by mass or less, more preferably 67.5% by mass or less, and still more preferably 67.0% by mass or less because such a fluoroelastomer (A) has good low-temperature resistance.

The fluoroelastomer (A) of the fluoroelastomer mixture of the present invention has an iodine atom.

The fluoroelastomer (A) having an iodine atom is preferably produced by known iodine transfer polymerization. This is because a polymer resulting from the fluoroelastomer (A) has narrow molecular weight distribution, which leads to easy control of the molecular weight, and an iodine atom can be introduced into a terminal of the polymer.

For example, a monomer constituting an elastomer is stirred under pressure substantially in an anoxic atmosphere in the presence of an iodine compound, preferably a diiodine compound, and at the same time, emulsion polymerized in an aqueous medium, suspension polymerized in an aqueous medium, or solution polymerized in the presence of a radical initiator.

A representative example of the iodine compound to be used is a compound represented by $RI_n$, wherein n is an integer of 1 or 2, and R, which may contain an oxygen atom, is a saturated or unsaturated C1-C8 fluorohydrocarbon group or chlorofluorohydrocarbon group, or a C1-C3 hydrocarbon group.

Specific preferable examples of the iodine compound used include monoiodomethane, 1-iodo-n-propane, isopropyl iodide, diiodomethane, 1,2-diiodoethane, 1,3-diiodo-n-propane, and $I(CF_2CF_2)_qI$, wherein q is an integer of 1 or greater.

An iodine atom is introduced into a fluoroelastomer obtained using such an iodine compound (for example, refer to JP 53-125491 A and JP 63-304009 A).

That is, the fluoroelastomer (A) is preferably produced by a known polymerization method using iodine transfer polymerization, such as emulsion polymerization, suspension polymerization, and solution polymerization. Polymerization conditions including a temperature and time at polymerization may be appropriately determined depending on the kind of a monomer and a desired elastomer. An emulsifier, a molecular weight adjuster, and/or a pH adjuster can be added. The molecular weight adjuster can be added all at once at the beginning or can be added continuously or in portions.

Extensive emulsifiers can be used in emulsion polymerization. Carboxylates having a fluorocarbon chain or a fluoropolyether chain are desirably used from the viewpoint of suppressing a chain transfer reaction of emulsifier molecules occurred during polymerization. A reactive emulsifier is desirably used.

The radical polymerization initiator to be used may be known organic peroxides and inorganic peroxides can be used, but not particularly limited thereto. Examples of oil-soluble organic peroxides include dialkyl peroxycarbonates, such as diisopropyl peroxydicarbonate, di-n-propyl peroxydicarbonate, and di-sec-butyl peroxydicarbonate; peroxyesters, such as t-butyl peroxybutyrate and t-butyl peroxypivalate; and dialkyl peroxides, such as di-t-butyl peroxide.

The inorganic peroxides preferably provide to a terminal of an elastomer a carboxyl group or a group to be a carboxyl group. Examples of the group generating a carboxyl group include acid fluorides, acid chlorides, and $CF_2OH$. Any of them generate a carboxyl group in the presence of water. Specific examples of the inorganic peroxides include ammonium persulfate (APS) and potassium persulfate (KPS).

Examples of the pH adjuster used in a polymerization system include electrolyte substances having a buffer capacity, such as phosphates, carbonates, and borates; sodium hydroxide; potassium hydroxide, and ammonium hydroxide.

The above-mentioned iodine compound may be used as the molecular weight adjuster.

A polymerization product can be separated from a polymerization reaction mixture, for example, in such a way that the polymerization reaction mixture is coagulated by metal salts such as magnesium chloride, calcium chloride, sodium chloride, magnesium sulfate, and barium sulfate.

The fluorine content of the fluoroelastomer (B) is 70.0% by mass or more. The fluoroelastomer (B) is a peroxide-vulcanizable fluoroelastomer having an iodine atom. The fluoroelastomer (B) is excellent in low fuel permeability because of its high fluorine content of 70.0% by mass or more. The fluoroelastomer (B) is fine-dispersed in the fluoroelastomer (A) forming a matrix, which results in the formation of micro domains. Therefore, in the case where the fluoroelastomer (B) is used in the form of a mixture with the fluoroelastomer (A) for a composition for vulcanization and the like, detour effect is imparted when fuel penetrates the polymer, which results in low permeability.

The fluoroelastomer (B) is preferably a polymer such that a cross-linked product thereof has better low fuel permeability than a cross-linked product of the fluoroelastomer (A). Further, the fluoroelastomer (B) is preferably a polymer which is less compatible with the fluoroelastomer (A) and which causes phase separation. The term "phase separation" means that glass transition temperatures depending on the respective polymers of the fluoroelastomers (A) and (B) are observed when the both fluoroelastomers (A) and (B) coexist.

Examples of the fluoroelastomer (B) include fluoroelastomers based on VdF, fluoroelastomers based on TFE, and fluoroelastomers based on ethylene (Et). Preferable among them are a copolymer (b1) consisting of a TFE unit and a PAVE unit, a copolymer (b2) consisting of a TFE unit, an Et unit, and a PAVE unit, and a copolymer (b3) consisting of a VdF unit, a TFE unit, and a HFP unit are preferable because these polymers thereselves are excellent in low fuel permeability. The copolymer (b1) consisting of a TFE unit and a PAVE unit, not containing a VdF unit, is more preferable because the copolymer (b1) is less compatible with the fluoroelastomer (A).

The perfluoro(alkyl vinyl ether) unit of the copolymers (b1) and (b2) is preferably a perfluoro(methyl vinyl ether) unit, a perfluoro(ethyl vinyl ether) unit, or a perfluoro(propyl vinyl ether) unit, and more preferably a perfluoro(methyl vinyl ether) unit.

The copolymer (b1) consists of 45 to 85 mol % of a tetrafluoroethylene unit and 15 to 55 mol % of a perfluoro(alkyl vinyl ether) unit, and is excellent in flexibility and low fuel permeability. In order to achieve better flexibility and low fuel permeability, the copolymer (b1) preferably consists of 50 to 85 mol % of a tetrafluoroethylene unit and 15 to 50 mol % of a perfluoro(alkyl vinyl ether) unit, and more preferably consists of 55 to 80 mol % of a tetrafluoroethylene unit and 20 to 45 mol % of a perfluoro(alkyl vinyl ether) unit.

The copolymer (b2) consists of 15 to 85 mol % of a tetrafluoroethylene unit, 1 to 30 mol % of an ethylene unit, and 14 to 55 mol % of a perfluoro(alkyl vinyl ether) unit, and is excellent in flexibility and low fuel permeability. In order to achieve better flexibility and low fuel permeability, the copolymer (b2) preferably consists of 20 to 70 mol % of a tetrafluoroethylene unit, 5 to 25 mol % of an ethylene unit, and 20 to 55 mol % of a perfluoro(alkyl vinyl ether) unit.

The copolymer (b3) consists of 25 to 85 mol % of a vinylidene fluoride unit, 0 to 40 mol % of a tetrafluoroethylene unit, and 15 to 40 mol % of a hexafluoro propylene unit. The copolymer (b3) is excellent in flexibility and low fuel permeability. In order to achieve better flexibility and low fuel permeability, the copolymer (b3) preferably consists of 30 to 70 mol % of a vinylidene fluoride unit, 10 to 40 mol % of a tetrafluoroethylene unit, and 15 to 35 mol % of a hexafluoropropylene unit.

The number average molecular weight (Mn) of the fluoroelastomer (B) is preferably 20,000 to 300,000 because such a fluoroelastomer has flowability so as to be fine-dispersed in the fluoroelastomer (A). The number average molecular weight (Mn) of the fluoroelastomer (B) is more preferably 25,000 to 250,000 and still more preferably 30,000 to 200,000.

The Mooney viscosity of the fluoroelastomer (B) at 100° C. is preferably 2 or higher and more preferably 5 or higher. This is because such a fluoroelastomer has good forming processability. Similarly, from the view point of good forming processability of the fluoroelastomer mixture, the Mooney viscosity of the fluoroelastomer mixture at 100° C. is preferably 200 or lower, more preferably 150 or lower, and still more preferably 100 or lower.

The fluoroelastomer (B) is excellent in low fuel permeability because the fluorine content thereof is 70.0% by mass or more. The fluorine content of the fluoroelastomer (B) is preferably 71.0% by mass or more. In order to achieve better low-temperature resistance and flexibility, the fluorine content of the fluoroelastomer (B) is preferably 74.0% by mass or less, and more preferably 73.5% by mass or less. It is a preferable embodiment that the fluoroelastomer (B) is an elastomer of a perfluoropolymer.

The fluoroelastomer (B) may be produced by, but not particularly limited to, a general polymerization method. For example, the fluoroelastomer (B) may be produced by the method for producing the fluoroelastomer (A), and preferably produced by iodine transfer polymerization.

The fluoroelastomer (A) and the fluoroelastomer (B) are preferably not compatible with each other. In this case, two glass transition temperatures are observed. If the fluoroelastomer (A) and the fluoroelastomer (B) are compatible with each other, the low fuel permeability improves, but the glass transition temperature remarkably increases, which may not give desired low-temperature resistance. In the fluoroelastomer (A) and the fluoroelastomer (B) not compatible with each other, the fluoroelastomer (A), which forms a matrix, is excellent in low-temperature-resistance which is the feature of the low-temperature-resistant fluororubber. Further, the fluoroelastomer (B) with low fuel permeability is fine-dispersed, and therefore low fuel permeability improves.

According to the various studies made by the present inventors, if two kinds of fluoroelastomers are sufficiently mixed with each other in the mixture containing these two elastomers, the formed product obtained may not show low fuel permeability. Such a tendency is unpredictable because, even if two kinds of fluoroelastomers are used, the functions derived from the two kinds of fluoroelastomers may not be exhibited in a formed product if such two kinds of fluoroelastomers are not sufficiently mixed with each other. Use of two kinds of fluoroelastomers causing "phase separation" leads to fine-dispersion of one fluoroelastomer in the other fluoroelastomer which forms a matrix. Probably, this fine-dispersion surprisingly causes excellent low fuel permeability due to the detour effect synergistically in addition to the functions derived from the two kinds of fluoroelastomers (for example, low-temperature resistance derived from the fluoroelastomer (A)).

The low fuel permeability of the fluoroelastomer mixture of the present invention is improved by including the fluoroelastomer (A) and the fluoroelastomer (B). Therefore, the formed product obtained by cross-linking the mixture has low fuel permeability and low hardness. On the other hand, flexibility which generally exists in an elastomer is impaired in a mixture of a fluoroelastomer and a fluororesin. The mixture of the present invention is made into a formed product having low fuel permeability, and maintaining low hardness giving functions as a rubber.

In order to achieve good low-temperature resistance, the glass transition temperature of the fluoroelastomer (A) is preferably lower than the glass transition temperature of the fluoroelastomer (B). Specifically, the glass transition temperature of the fluoroelastomer (A) is preferably −33° C. to −20° C., and more preferably −32° C. to −24° C. In order to achieve good low fuel permeability, the glass transition temperature of the fluoroelastomer (B) is preferably higher than the glass transition temperature of the fluoroelastomer (A). Specifically, the glass transition temperature of the fluoroelastomer (B) is preferably −20° C. to −10° C., and more preferably −15° C. to −5° C.

The glass transition temperatures of the fluoroelastomers (A) and (B) are measured using differential-scanning-calorimetry (DSC) equipment. The measurement may be separately performed on the fluoroelastomer (A) and the fluoroelastomer (B), or may be performed on the mixture thereof. The glass transition temperatures of the fluoroelastomer (A) and fluoroelastomer (B), or of the fluoroelastomer mixture are determined by measuring heat balance of a second scan at a rate of temperature rise of 10° C./min in a temperature range of −50° C. to 150° C., and by a midpoint method using two points of inflection detected.

The iodine atom content of each of the fluoroelastomers (A) and (B) is preferably 0.001 to 10% by weight, more preferably 0.01 to 5% by weight, and further more preferably 0.1 to 5% by weight. The iodine content can be measured in the following ways. The amount 5 mg of $Na_2SO_3$ is mixed with 12 mg of a sample (fluoroelastomer), a solution which is dissolved 30 mg of $Na_2CO_3$ and $K_2CO_3$ mixed in the proportion of one to one (weight ratio) with 20 ml of pure water is used as an absorption liquid, the mixture is burned in an oxygen atmosphere in a combustion flask made of quartz, and the resultant absorption liquid is allowed to stand for 30 minutes, and the iodine content can be measured using Shimazu 20A ion chromatograph. A calibration curve can be determined using a KI standard solution, a solution containing 0.5 ppm of an iodine ion, or a solution containing 1.0 ppm of an iodine ion.

The iodine atom may be attached to either one of an end of a main chain or an end of a side chain of the fluoroelastomer, or may be attached to the both ends. Such a fluoroelastomer has a cross-linking point (cross-linking site) at an iodine end or a bromine end. Therefore, a cross-linked fluoroelastomer with high crosslinking density can be produced, and the fluoroelastomer can be more easily peroxide-cross-linked.

Use of the fluoroelastomer mixture of the present invention gives a formed product having a TR10 of −30° C. or less, and further gives a formed product having a fuel permeation coefficient of 75 g·cm/cm²·s·cmHg or less.

The fluoroelastomer mixture of the present invention can be produced by various methods. If the fluoroelastomer mixture is the mixed powder, the fluoroelastomer mixture may be produced, for example, by a method of mixing powder of the fluoroelastomer (A) and powder of the fluoroelastomer (B) with a common mixer or the like, or a method of producing co-coagulated powder by co-coagulation of aqueous dispersion containing the fluoroelastomer (A) and the fluoroelastomer (B).

If the fluoroelastomer mixture is the aqueous dispersion, the fluoroelastomer mixture may be produced, for example, by a method of mixing aqueous dispersion of the fluoroelastomer (A) and aqueous dispersion of the fluoroelastomer (B), a method of adding aqueous dispersion of the fluoroelastomer (B) to aqueous dispersion of the fluoroelastomer (A), or a method of adding aqueous dispersion of the fluoroelastomer (A) to aqueous dispersion of the fluoroelastomer (B).

In order to disperse the fluoroelastomer (A) and the fluoroelastomer (B) more uniformly, the method for producing the fluoroelastomer preferably includes a co-coagulation step for co-coagulation of aqueous dispersion including the fluoroelastomer (A) and the fluoroelastomer (B).

Examples of the method for the co-coagulation include a method (i) of mixing aqueous dispersion of the fluoroelastomer (A) and aqueous dispersion of the fluoroelastomer (B), and then allowing the dispersion to undergo coagulation, a method (ii) of adding powder of the fluoroelastomer (A) to aqueous dispersion of the fluoroelastomer (B), and then allowing the dispersion to undergo coagulation, and a method (iii) of adding powder of the fluoroelastomer (B) to aqueous dispersion of the fluoroelastomer (A), and then allowing the dispersion to undergo coagulation.

Among them, the method (i) is particularly preferable because the elastomers are easily dispersed uniformly.

The co-coagulation is preferably performed by adding acids such as nitric acid, hydrochloric acid, and sulfuric acid;

or metal salts such as magnesium chloride, calcium chloride, sodium chloride, aluminium sulfate, magnesium sulfate, and barium sulfate.

In the method for producing the fluoroelastomer mixture, at least one of the fluoroelastomers (A) and (B) is preferably produced by a method including the iodine transfer polymerization. That is, the method for producing the fluoroelastomer mixture of the present invention preferably includes the step of polymerizing at least one of the fluoroelastomers (A) and (B) by radical polymerization in the presence of an iodine compound represented by $RI_n$ (in the formula, n is an integer of 1 or 2, and R is a saturated or unsaturated C1-C8 fluorohydrocarbon group or chlorofluorohydrocarbon group, or a C1-C3 hydrocarbon group, which may contain an oxygen atom).

The present invention also relates to a composition for peroxide vulcanization, comprising the fluoroelastomer mixture (i), a polyfunctional unsaturated compound (ii), and a peroxide (iii). The composition for peroxide vulcanization of the present invention is made into a formed product having excellent low-temperature resistance and excellent low fuel permeability because the composition contains the fluoroelastomer mixture.

The polyfunctional unsaturated compound (ii) may be, but not limited to, a compound reactive to a peroxy radical and a polymer radical. Examples of the compound include polyfunctional compounds having a functional group, such as $CH_2=CH-$, $CH_2=CHCH_2-$, and $CF_2=CF-$. Specific examples of the polyfunctional compound include triallyl cyanurate, triallyl isocyanurate (TAIC), trimethallyl isocyanurate, TAIC prepolymer, triacrylformal, triallyl trimellitate, N,N'-n-phenylenebismaleimide, dipropargyl terephthalate, diallyl phthalate, tetraallyl terephthalate amide, triallyl phosphate, bismaleimide, fluorinated triallyl isocyanurate (1,3,5-tris(2,3,3-trifluoro-2-propenyl)-1,3,5-triazine-2,4,6-trione), tris(diallylamine)-S-triazine, triallyl phosphite, N,N-diallylacrylamide, 1,6-divinyldodecafluorohexane, hexaallylphosphoramide, N,N,N',N'-tetraallylphthalamide, N,N,N',N'-tetraallylmaronamide, trivinylisocyanurate, 2,4,6-trivinylmethyltrisiloxane, tri(5-norbornene-2-methylene)cyanurate, and triallylphosphite. Among these, triallylisocyanurate (TAIC) is preferable because of its good vulcanization characteristics and physical properties of its vulcanized product.

The amount of the polyfunctional unsaturated compound is preferably 0.5% by mass or more, and more preferably 1.0% by mass or more, to the total amount of the fluoroelastomers (A) and (B) because a vulcanizate of such a compound has good compression set and strength characteristics. Further, the amount of the polyfunctional unsaturated compound is preferably 6.0% by mass or less, and more preferably 5.0% by mass or less, to the total amount of the fluoroelastomers (A) and (B) in order to prevent a metal mold from getting dirty.

The peroxide (iii) may be one easily generating peroxy radicals in the presence of heat or in oxidation-reduction system. Examples of the peroxide (iii) include 1,1-bis(t-butylperoxy)-3,5,5-trimethylcyclohexane, 2,5-dimethylhexane-2,5-dihydroxyperoxide, di-t-butylperoxide, t-butylcumylperoxide, dicumylperoxide, α,α'-bis(t-butylperoxy)-p-diisopropylbenzene, 2,5-dimethyl-2,5-di(t-butylperoxy)hexane, 2,5-dimethyl-2,5-di(t-butylperoxy)hexyne-3, benzoylperoxide, t-butylperoxybenzene, 2,5-dimethyl-2,5-di(benzoylperoxy)hexane, t-butylperoxy maleic acid, and t-butylperoxyisopropyl carbonate. Of those, the dialkyl compounds are preferable. The kind and amount of the peroxide (iii) are generally determined in accordance with the amount of activated —O—O—, a decomposition temperature, and the like.

The amount of the peroxide is preferably 0.5% by mass or more, and more preferably 1.0% by mass or more, to the total amount 100% by weight of the fluoroelastomers (A) and (B) in order to achieve a sufficiently high curing speed. The amount of the peroxide is preferably 10.0% by mass or less, and more preferably 5.0% by mass or less, to the total amount 100% by mass of the fluoroelastomers (A) and (B) in order to provide sufficient vulcanization characteristics.

Common additives which are blended with a vulcanizable elastomer composition if needed may be blended with the composition for peroxide vulcanization. Examples of the additives include fillers, processing aids, plasticizers, and colorants. Further, one or more of conventional vulcanizing agents and/or vulcanization accelerators other than those mentioned above may be blended. Furthermore, other elastomers may be blended insofar as the effects of the present invention are not impaired.

The composition for peroxide vulcanization may contain a common filler.

Examples of the common filler include organic fillers made of engineering plastics, such as polyarylate, polysulfone, polyether sulfone, polyphenylene sulfide, polyoxybenzoate, and polytetrafluoroethylene powder; metal oxide fillers, such as aluminium oxide, silicon oxide, yttrium oxide, and titanium oxide; metal carbide fillers, such as silicon carbide and aluminium carbide; metal nitride fillers, such as silicon nitride and aluminium nitride; and inorganic fillers, such as aluminium fluoride, carbon fluoride, barium sulfate, carbon black, silica, clay, and talc.

Among these, layered minerals including montmorillonite as a representative example are useful for improving low fuel permeability.

The inorganic filler and the organic filler may be used alone, or two or more of these may be used in combination.

The composition for peroxide vulcanization can be prepared by mixing the above components with any processing apparatus for rubbers, for example, an open roll mill, Banbury mixer, or kneader. Other than these, the composition can be prepared by a process using a closed-mixer or co-coagulation of emulsion mixed.

The vulcanization conditions of the composition for peroxide vulcanization are not particularly limited. The composition can be vulcanized under common vulcanization conditions for a fluoroelastomer composition. For example, the composition for peroxide vulcanization is put into a metal mold, and heated at 120° C. to 250° C. (preferably 160° C. to 220° C., more preferably 180° C. to 220° C.) under pressure for 1 to 120 minutes to be press-vulcanized. Subsequently, the resultant is heated at 160° C. to 300° C. (preferably 180° C. to 250° C., more preferably 180° C. to 200° C.) for 0 to 48 hours (preferably 4 to 24 hours) in a furnace to be oven-vulcanized. As a result, a vulcanizate can be obtained.

The present invention also relates to a formed product obtained from the composition for peroxide vulcanization. Examples of the formed product include, but not limited to, the following formed products.

Sealing Material:

In the field of automobiles, the formed product may be used as a gasket, a shaft seal, a valve stem seal, or various sealing materials which are used for an engine and its peripheral equipment; or various sealing materials for an AT equipment. Examples of sealing materials employed for a fuel system and its peripheral equipment include an O (square) ring, a packing, and a diaphragm. Specifically, the formed products of the present invention can be used as engine head gaskets, metal gaskets, oil pan gaskets, crank shaft seals, cam shaft seals, valve stem seals, manifold packing, seals for oxygen sensors, injector O-rings, injector packing, fuel pump O-rings, diaphragms, crankshaft seals, gearbox seals, power piston packing, seals of cylinder liners, seals in valve stems, seals in front pumps in automatic transmissions, rear axle pinion seals, gaskets of universal joints, pinion seals in speedometers, piston cups of footbrakes, O-rings of torque transmissions, oil seals, seals in exhaust gas afterburners, bearing seals, diaphragms for sensors in carburetors.

Particularly, the formed product is preferably parts for automobiles which are in contact with fuel. That is, the present invention also relates to automobile parts which are in contact with fuel. The parts are formed from the composition for peroxide vulcanization. Specific examples of the automobile parts which are in contact with fuel include, but not limited to, the formed products in the field of automobiles.

In the field of aircraft, rockets, and ships and vessels, examples include a diaphragm, an O (square) ring, a valve, a packing, and various sealing materials, and these can be employed for a fuel system. Specifically, in the aircraft field, the formed products of the present invention are employed in jet engine valve stem seals, gaskets and O-rings, rotating shaft seals, gaskets of hydraulic equipment, fire wall seals, and the like. In the ships and vessels field, they are used as seals in the sterns of propeller shafts of screws, valve stem seals for intake air and exhaust air in diesel engines, valve seals of butterfly valves, shaft seals of butterfly valves, and the like.

EXAMPLES

The present invention is explained by means of examples, but is not limited thereto.

The measuring method and the like used in the present description were described below.

<Raw Rubber Specific Gravity Value>

The raw rubber specific gravity value is measured in accordance with JIS K6268 using automatic hydrometer Model D-1 produced by Toyo Seiki Seisaku-sho, LTD.

<Fluoroelastomer (B) (Perfluoro Rubber) Content>

The fluoroelastomer (B) content is calculated based on the raw rubber specific gravity value.

<Monomer Unit Composition of Polymer, Fluorine Content>

The fluorine content of a fluoroelastomer mixture is determined by a composition ratio of each polymer calculated from the raw rubber specific gravity value.

The fluorine content of each polymer is determined by calculation from the polymer composition determined in $^{19}$F-NMR.

<Glass Transition Temperature (Tg)>

Tg is measured using DSC equipment produced by METTLER-TOLEDO International Inc. Tg is determined by measuring, on a 10 mg of a polymer, heat balance of a second scan at a rate of temperature rise of 10° C./min in a temperature range of −50° C. to 150° C., and by a midpoint method using two points of inflection detected.

<Mooney Viscosity>

The Mooney viscosity is measured in accordance with ASTM-D1646 and JIS K6300

Measurement instrument: MV2000E produced by Alpha Technologies.

Rotation speed of a rotor: 2 rpm

Measurement temperature: 100° C.

<100% Modulus (M100)>

The compositions are each made into a sheet having a thickness of 2 mm by primary press vulcanization and secondary oven vulcanization under the following standard vulcanization conditions, and the 100% modulus is measured in accordance with JIS-K6251.

(Standard Vulcanization Conditions)

Kneading method: roll kneading

Press vulcanization: 10 minutes at 160° C.

Oven vulcanization: 4 hours at 180° C.

<Tensile Strength at Break (Tb) and Tensile Elongation at Break (Eb)>

The compositions are each made into a sheet having a thickness of 2 mm by primary press vulcanization and secondary oven vulcanization under the standard vulcanization conditions, and the tensile strength at break (Tb) and the tensile elongation at break (Eb) are measured in accordance with JIS-K6251.

<Hardness (Hs)>

The compositions are each made into a sheet having a thickness of 2 mm by primary press vulcanization and secondary oven vulcanization under the standard vulcanization conditions, and the hardness is measured in accordance with JIS-K6253.

<Low-Temperature Resistance (TR10)>

The Low-temperature resistance is measured in accordance with ASTM D1329 by a TR testing machine produced by Ueshima Seisakusho Co., Ltd.

<Fuel Permeability (P)>

The compositions are each made into a sheet having a thickness of 0.5 mm by primary press vulcanization and secondary oven vulcanization under the following standard vulcanization conditions, and the fuel permeation coefficient is measured at 40° C. using CE20 by a cup method in accordance with ASTM E96. The smaller the fuel permeation coefficient is, the better the low fuel permeability is.

(Standard Vulcanization Conditions)

Kneading method: roll kneading

Press vulcanization: 10 minutes at 160° C.

Oven vulcanization: 4 hours at 180° C.

Reference Example 1

Polymerization of a VdF/TFE/PMVE Copolymer

A stainless-steel autoclave having 30 L-internal capacity was charged with 15 kg of pure water, 30.0 g of $C_7F_{15}COONH_4$ as an emulsifier, and 1.3 g of disodium hydrogen phosphate. Air in the system was sufficiently replaced with nitrogen gas to be removed, and the content was heated to 80° C. while stirring at 150 rpm. Then, VdF, TFE, and PMVE (VdF/TFE/PMVE=64/8/28 mol %) were fed thereinto so that the inner pressure was adjusted to 0.80 MPa·G. Subsequently, 20 mL of an ammonium persulfate (APS) aqueous solution with a concentration of 42.5 mg/mL was injected under nitrogen pressure to initiate reaction. The inner pressure was reduced to 0.75 MPa·G as the progress of polymerization, and at this point, 24.9 g of I $(CF_2CF_2)_2$I was injected under nitrogen pressure. Subsequently, the mixed gas of VdF, TFE, and PMVE (VdF/TFE/PMVE=68/12/20 mol %) was injected so that the inner pressure was increased to 0.85 MPa·G. The mixed gas of VdF, TFE, and PMVE (VdF/TFE/PMVE=68/12/20 mol %) was injected, and increase and decrease in inner pressure were repeated in the range of from 0.75 to 0.85 MPa·G. APS was added to the mixture every 3 hours so that the total addition amount of APS was 840 mg by the end of the polymerization.

After 14 hours from the start of the polymerization reaction, the total amount of VdF, TFE, and PMVE added was 5.0 kg. At this point, the autoclave was cooled and an unreacted monomer was discharged to give 20.9 kg of aqueous dispersion having a solid concentration of 27.7% by mass.

A part (2.0 kg) of the obtained dispersion was allowed to undergo coagulation using aluminium sulfate, the resulting product sufficiently rinsed with pure water, and hot-air dried at 80° C. for 8 hours and at 120° C. for 12 hours. Thus, 433 g of a polymer was prepared. The analysis showed that the monomer unit composition of the polymer was VdF/TFE/PMVE=67/14/19 mol %, the Mooney viscosity at 100° C. was 25, the fluorine content was 65.3% by mass, and the glass transition temperature measured using DSC was −31° C.

Reference Example 2

A stainless-steel autoclave having 6 L-internal capacity was charged with 3000 g of pure water, 30 g of $C_3F_7OCF(CF_3)CF_2OCF(CF_3)COONH_4$ as an emulsifier, and 0.27 g of $(NH_4)_2CO_3$. Air in the system was sufficiently replaced with nitrogen gas to be removed, and the content of the autoclave was heated to 50° C. while stirring at 600 rpm. Then, the mixed gas of tetrafluoroethylene (TFE) and perfluoromethylvinylether (PMVE) (TFE/PMVE=25.6/74.4 mol %) was initially fed so that the inner pressure was 0.83 MPa·G. Subsequently, a solution prepared by dissolving 0.558 g of ammonium persulfate (APS) in 10 g of pure water was injected under nitrogen pressure to initiate reaction.

The inner pressure was reduced to 0.73 MPa·G as the progress of polymerization. At this point, 3.03 g of $I(CF_2CF_2)_2I$ was injected under nitrogen pressure. Subsequently, TFE and PMVE (TFE/PMVE=62/38 mol %) was fed so that the inner pressure was increased to 0.83 MPa·G. The inner pressure was reduced to 0.73 MPa·G as the progress of polymerization. At this point, TFE and PMVE (TFE/PMVE=70/30 mol %) were fed so that the inner pressure reached 0.83 MPa·G. Increase and decrease in inner pressure were repeated in the range of from 0.73 to 0.83 MPa·G.

After 11.7 hours from the start of the polymerization reaction, the total amount of TFE added was 304 g and the total amount of PMVE added was 311 g. At this point, the autoclave was cooled and an unreacted monomer was discharged to give 3630 g of aqueous dispersion having a solid concentration of 16.2% by mass.

An amount of 1000 g of the aqueous dispersion was diluted with 1000 g of pure water, and the resulting solution was added slowly to 5000 g of 3.5% by mass of hydrochloric acid while stirring. After the addition, the solution was stirred for 5 minutes to coagulate a polymer. The polymer was separated from the solution by filtration. The resulting polymer was added to 5000 g of pure water again, and the aqueous solution was stirred for 5 minutes. The polymer was separated by filtration again. Then, rinse with water and filtration of the polymer were repeated, and the polymer was taken out when pH of water after the rinse was 6 or higher. An amount of 3514 g of the aqueous dispersion produced by polymerization was treated by the same operations, and the whole resulting polymer was dried under vacuum at 120° C. for 24 hours to produce 581 g of a dried polymer.

The analysis showed that the monomer unit composition of the polymer was TFE/PMVE=63.3/36.7 mol %, and the Mooney viscosity was 74. The fluorine content was 73.0% by mass, and the glass transition temperature measured using DSC was −5° C.

Example 1

An amount of 610 g (polymer content of 170 g) of the dispersion obtained in Reference Example 1 and 190 g (polymer content of 30 g) of the dispersion obtained in Reference Example 2 were mixed at room temperature. Then, a polymer was co-coagulated using aluminium sulfate, sufficiently rinsed with pure water, and hot-air dried at 80° C. for 8 hours and at 120° C. for 12 hours. Thus, 200 g of a polymer (mixed elastomer powder) was prepared. The raw rubber specific gravity value of the mixed elastomer powder was 1.833 g/cm$^3$. The TFE/PMVE copolymerized elastomer content in the following Table 1 was calculated from the raw rubber specific gravity value.

To 100% by mass of the mixed elastomer powder, 20% by mass of carbon black (Thermax N990 produced by Cancarb Ltd.), 3% by mass of TRIC, and 1.5% by mass of dialkyl peroxide (perhexa 25B produced by NOF CORPORATION) were kneaded to produce a composition for vulcanization. The resulting composition for vulcanization was press-vulcanized and oven-vulcanized under standard vulcanization conditions to produce a formed product having excellent low-temperature resistance, low fuel permeability, and flexibility. Table 1 shows the physical properties of the formed product.

Example 2

An amount of 510 g of the dispersion (polymer content of 140 g) obtained in Reference Example 1 and 380 g of the dispersion (polymer content of 60 g) obtained in Reference Example 2 were mixed at room temperature. Then, the dispersion was allowed to undergo co-coagulation using aluminium sulfate, sufficiently rinsed with pure water, and hot-air dried at 80° C. for 8 hours and at 120° C. for 12 hours. Thus, 200 g of a polymer (mixed elastomer powder) was prepared.

The mixed elastomer powder was produced in the same way as in Example 1, and the composition for vulcanization was produced and the physical properties of the composition for vulcanization were measured in the same way as in Example 1.

The resulting composition for vulcanization was press-vulcanized and oven-vulcanized under standard vulcanization conditions to produce a formed product having excellent low-temperature resistance and low fuel permeability. Table 1 shows the physical properties of the formed product. The raw rubber specific gravity value of the mixed elastomer powder in Example 2 was 1.874 g/cm$^3$.

Comparative Example 1

To 100% by mass of the elastomer powder obtained in Reference Example 1, 20% by mass of carbon black (Thermax N990 produced by Cancarb Ltd.), 3% by mass of TRIC, and 1.5% by mass of dialkyl peroxide (perhexa 25B produced by NOF CORPORATION) were kneaded to produce a composition for vulcanization. The resulting composition for vulcanization was press-vulcanized and oven-vulcanized under standard vulcanization conditions to produce a formed product. Table 1 shows the physical properties of the formed product.

TABLE 1

| Physical properties in normal state | Unit | Example 1 | Example 2 | Comparative Example 1 |
|---|---|---|---|---|
| M100 | MPa | 2 | — | 2 |
| Tb | MPa | 16 | — | 15 |
| Eb | % | 300 | — | 290 |
| Hardness | After one second | 62 | — | 62 |

TABLE 1-continued

| Physical properties in normal state | Unit | Example 1 | Example 2 | Comparative Example 1 |
|---|---|---|---|---|
| TR10 | °C. | −31 | −26 | −31 |
| Fuel permeation coefficient | g·cm/cm²·s·cmHg | 73 | 50 | 80 |
| TFE/PMVE copolymer elastomer content | wt % | 12.98 | 31.66 | 0 |

The invention claimed is:

1. A fluoroelastomer mixture, comprising:

a peroxide-vulcanizable fluoroelastomer (A) containing an iodine atom; and a peroxide-vulcanizable fluoroelastomer (B) containing an iodine atom, the fluoroelastomer (A) being a copolymer (a1) consisting of 50 to 85 mol % of a vinylidene fluoride unit and 15 to 50 mol % of a perfluoro(alkyl vinyl ether) unit, or a copolymer (a2) consisting of 45 to 85 mol % of a vinylidene fluoride unit, 1 to 30 mol % of a tetrafluoroethylene unit, and 14 to 30 mol % of a perfluoro(alkyl vinyl ether) unit, a fluorine content of the fluoroelastomer (B) being 70.0% by mass or more, wherein the fluoroelastomer (B) is at least one copolymer selected from the group consisting of:

a copolymer (b1) consisting of 45 to 85 mol % of a tetrafluoroethylene unit and 15 to 55 mol % of a perfluoro(alkyl vinyl ether) unit;

a copolymer (b2) consisting of 15 to 85 mol % of a tetrafluoroethylene unit, 1 to 30 mol % of an ethylene unit, and 14 to 55 mol % of a perfluoro(alkyl vinyl ether) unit; and a copolymer (b3) consisting of 25 to 85 mol % of a vinylidene fluoride unit, 0 to 40 mol % of a tetrafluoroethylene unit, and 15 to 40 mol % of a hexafluoropropylene unit, and wherein a mass ratio (A)/(B) of the fluoroelastomer (A) to the fluoroelastomer (B) is 60/40 to 95/5.

2. A composition for peroxide vulcanization, comprising (i) a fluoroelastomer mixture comprising:

a peroxide-vulcanizable fluoroelastomer (A) containing an iodine atom; and a peroxide-vulcanizable fluoroelastomer (B) containing an iodine atom, the fluoroelastomer (A) being a copolymer (a1) consisting of 50 to 85 mol % of a vinylidene fluoride unit and 15 to 50 mol % of a perfluoro(alkyl vinyl ether) unit, or a copolymer (a2) consisting of 45 to 85 mol % of a vinylidene fluoride unit, 1 to 30 mol % of a tetrafluoroethylene unit, and 14 to 30 mol % of a perfluoro(alkyl vinyl ether) unit, a fluorine content of the fluoroelastomer (B) being 70.0% by mass or more, wherein the fluoroelastomer (B) is at least one copolymer selected from the group consisting of:

a copolymer (b1) consisting of 45 to 85 mol % of a tetrafluoroethylene unit and 15 to 55 mol % of a perfluoro(alkyl vinyl ether) unit;

a copolymer (b2) consisting of 15 to 85 mol % of a tetrafluoroethylene unit, 1 to 30 mol % of an ethylene unit, and 14 to 55 mol % of a perfluoro(alkyl vinyl ether) unit; and a copolymer (b3) consisting of 25 to 85 mol % of a vinylidene fluoride unit, 0 to 40 mol % of a tetrafluoroethylene unit, and 15 to 40 mol % of a hexafluoropropylene unit, and wherein a mass ratio (A)/(B) of the fluoroelastomer (A) to the fluoroelastomer (B) is 60/40 to 95/5;

(ii) a polyfunctional unsaturated compound; and (iii) a peroxide.

3. A formed product obtained by vulcanizing the composition for peroxide vulcanization as claimed in claim 2.

4. A method for producing a fluoroelastomer mixture comprising:

a peroxide-vulcanizable fluoroelastomer (A) containing an iodine atom; and a peroxide-vulcanizable fluoroelastomer (B) containing an iodine atom, the fluoroelastomer (A) being a copolymer (a1) consisting of 50 to 85 mol % of a vinylidene fluoride unit and 15 to 50 mol % of a perfluoro(alkyl vinyl ether) unit, or a copolymer (a2) consisting of 45 to 85 mol % of a vinylidene fluoride unit, 1 to 30 mol % of a tetrafluoroethylene unit, and 14 to 30 mol % of a perfluoro(alkyl vinyl ether) unit, a fluorine content of the fluoroelastomer (B) being 70.0% by mass or more, wherein the fluoroelastomer (B) is at least one copolymer selected from the group consisting of:

a copolymer (b1) consisting of 45 to 85 mol % of a tetrafluoroethylene unit and 15 to 55 mol % of a perfluoro(alkyl vinyl ether) unit;

a copolymer (b2) consisting of 15 to 85 mol % of a tetrafluoroethylene unit, 1 to 30 mol % of an ethylene unit, and 14 to 55 mol % of a perfluoro(alkyl vinyl ether) unit; and a copolymer (b3) consisting of 25 to 85 mol % of a vinylidene fluoride unit, 0 to 40 mol % of a tetrafluoroethylene unit, and 15 to 40 mol % of a hexafluoropropylene unit, and wherein a mass ratio (A)/(B) of the fluoroelastomer (A) to the fluoroelastomer (B) is 60/40 to 95/5, which method comprises the step of co-coagulating an aqueous dispersion containing the fluoroelastomer (A) and the fluoroelastomer (B).

5. The fluoroelastomer mixture as claimed in claim 1, wherein the fluoroelastomer (B) is fine-dispersed in the fluoroelastomer (A) forming a matrix.

6. The fluoroelastomer mixture as claimed in claim 1, wherein the fluoroelastomer (A) has a glass transition temperature of from −33° C. to −20° C. and the fluoroelastomer (B) has a glass transition temperature that is higher than the glass transition temperature of the fluoroelastomer (A) and is from −20° C. to −10° C.

7. The fluoroelastomer mixture as claimed in claim 1, wherein the fluoroelastomer (A) has a glass transition temperature of from −33° C. to −20° C. and the fluoroelastomer (B) has a glass transition temperature of from −15° C. to −5° C.

* * * * *

UNITED STATES PATENT AND TRADEMARK OFFICE
CERTIFICATE OF CORRECTION

PATENT NO. : 8,450,423 B2
APPLICATION NO. : 13/260913
DATED : May 28, 2013
INVENTOR(S) : Shoji Fukuoka et al.

It is certified that error appears in the above-identified patent and that said Letters Patent is hereby corrected as shown below:

In the Specification

Column 7, lines 57-59, delete

"Specifically, the glass transition temperature of the fluoroelastomer (B) is preferably -20°C. to -10°C., and more preferably -15°C. to -5°C."

and insert

--Specifically, the glass transition temperature of the fluoroelastomer (B) is preferably -20°C. to 10°C., and more preferably -15°C. to 5°C.--

Column 16, lines 52-57 (Claim 6), delete

"The fluoroelastomer mixture as claimed in claim 1, where in the fluoroelastomer (A) has a glass transition temperature of from -33°C. to -20°C. and the fluoroelastomer (B) has a glass transition temperature that is higher than the glass transition temperature of the fluoroelastomer (A) and is from -20°C. to -10°C."

and insert

--The fluoroelastomer mixture as claimed in claim 1, where in the fluoroelastomer (A) has a glass transition temperature of from -33°C. to -20°C. and the fluoroelastomer (B) has a glass transition temperature that is higher than the glass transition temperature of the fluoroelastomer (A) and is from -20°C. to 10°C.--

Signed and Sealed this
Fifteenth Day of October, 2013

Teresa Stanek Rea
*Deputy Director of the United States Patent and Trademark Office*

CERTIFICATE OF CORRECTION (continued)
U.S. Pat. No. 8,450,423 B2

Column 16, lines 58-62 (Claim 7), delete

"The fluoroelastomer mixture as claimed in claim 1, where in the fluoroelastomer (A) has a glass transition temperature of from -33°C. to -20°C. and the fluoroelastomer (B) has a glass transition temperature of from -15°C. to -5°C."

and insert

--The fluoroelastomer mixture as claimed in claim 1, where in the fluoroelastomer (A) has a glass transition temperature of from -33°C. to -20°C. and the fluoroelastomer (B) has a glass transition temperature of from -15°C. to 5°C.--